United States Patent
Ichikawa

(10) Patent No.: US 8,611,824 B2
(45) Date of Patent: Dec. 17, 2013

(54) VEHICLE, COMMUNICATION SYSTEM FOR VEHICLE, AND COMMUNICATION CONTROLLING METHOD FOR VEHICLE

(75) Inventor: Shinji Ichikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 7 days.

(21) Appl. No.: 13/519,455

(22) PCT Filed: Dec. 28, 2009

(86) PCT No.: PCT/JP2009/071745
§ 371 (c)(1),
(2), (4) Date: Jun. 27, 2012

(87) PCT Pub. No.: WO2011/080815
PCT Pub. Date: Jul. 7, 2011

(65) Prior Publication Data
US 2012/0295547 A1    Nov. 22, 2012

(51) Int. Cl.
*H04B 3/00* (2006.01)

(52) U.S. Cl.
USPC ....... 455/66.1; 455/552.1; 455/417; 455/400; 455/569.1; 455/426; 455/422; 455/402; 455/426.1; 320/109; 320/128; 320/137; 320/104; 320/133; 320/116; 320/108; 320/115

(58) Field of Classification Search
USPC .......... 455/66.1, 552.1, 417, 400, 569.1, 426, 455/422, 402, 426.1; 320/109, 128, 137, 320/104, 133, 116, 108, 115
See application file for complete search history.

(56) References Cited

U.S. PATENT DOCUMENTS

| | | | | |
|---|---|---|---|---|
| 5,462,439 A | * | 10/1995 | Keith | 320/109 |
| 5,552,789 A | * | 9/1996 | Schuermann | 340/5.21 |
| 2003/0015358 A1 | * | 1/2003 | Abe et al. | 180/65.3 |
| 2003/0129978 A1 | * | 7/2003 | Akiyama et al. | 455/426 |
| 2005/0024061 A1 | * | 2/2005 | Cox et al. | 324/426 |
| 2007/0287380 A1 | * | 12/2007 | Hui et al. | 455/41.1 |
| 2009/0014463 A1 | * | 1/2009 | Brozell et al. | 221/288 |
| 2009/0043450 A1 | * | 2/2009 | Tonegawa et al. | 701/36 |

FOREIGN PATENT DOCUMENTS

| | | |
|---|---|---|
| EP | 1 865 623 A1 | 12/2007 |
| JP | 2000-324142 A | 11/2000 |
| JP | 2003-229790 A | 8/2003 |
| JP | 2007-194929 A | 8/2007 |
| JP | 2007-228695 A | 9/2007 |

OTHER PUBLICATIONS

International Search Report mailed Jan. 26, 2010 of PCT/JP2009/071745.
Supplementary European Search Report of EP 09 85 2793 mailed Jun. 6, 2012.

* cited by examiner

*Primary Examiner* — Fayyaz Alam
*Assistant Examiner* — Ganiyu A Hanidu
(74) *Attorney, Agent, or Firm* — Kenyon & Kenyon LLP

(57) ABSTRACT

A vehicle includes a wireless communication device, a PLC processing device, and a communication control device. The wireless communication device wirelessly communicates with a wireless communication device external to the vehicle. The PLC processing device communicates with a PLC processing device external to the vehicle by utilizing, as a communication path, a charging cable and a charging port to which the charging cable is connected. The communication control device controls communication by the wireless communication device and communication by the PLC processing device, depending on the remaining amount of data to be transmitted.

3 Claims, 4 Drawing Sheets

VEHICLE, COMMUNICATION SYSTEM FOR VEHICLE, AND COMMUNICATION CONTROLLING METHOD FOR VEHICLE

This is a 371 national phase application of PCT/JP2009/071745 filed 28 Dec. 2009, the contents of which are incorporated herein by reference.

TECHNICAL FIELD

The present invention relates to a vehicle, a communication system for a vehicle, and a communication control method for a vehicle, and particularly to a control technology for wireless communication and communication using a charging cable as a communication path.

BACKGROUND ART

Vehicles having electric motors as their driving sources are known, such as hybrid vehicles, electric vehicles, and fuel cell vehicles. Each of such vehicle is provided with a battery for storing electric power to be supplied to the electric motor. Some of the vehicles are configured to be capable of charging the battery with electric power supplied from a power supply external to the vehicle. Hereinafter, a vehicle capable of charging the battery with electric power supplied from a power supply external to the vehicle is also referred to as a plug-in vehicle. Electric power is supplied to a battery mounted on a plug-in vehicle via a charging cable or the like connected to the plug-in vehicle.

A well known technology relating to PLC (Power Line Communication) makes it possible to utilize a charging cable as a communication path. Generally, PLC is capable of sending and receiving data faster than wireless communication. Therefore, a fast transmission of data for use in, for example, a car navigation system for a plug-in vehicle can be achieved by PLC utilizing a charging cable, instead of wireless communication utilizing a mobile phone or the like.

However, PLC is not always more suitable than wireless communication. Thus, a technology for making a switch between PLC and wireless communication depending on the state of communication has been proposed.

Japanese Patent Laying-Open No. 2003-229790 (Patent Literature 1) discloses a communication system that makes a selective switch between a wireless system, which performs communication with the other party of the communication via a wireless line, and a wire system, which performs communication with the other party of the communication via a power line supplying electric power to a communication terminal, to perform communication. The communication system detects the communication quality of each of the wireless and wire systems and makes a system switch to a system with better communication quality.

CITATION LIST

Patent Literature

PTL 1: Japanese Patent Laying-Open No. 2003-229790

SUMMARY OF INVENTION

Technical Problem

However, a switch between communication paths takes a predetermined period of time. Consequently, when a switch between communication paths is made during receiving or sending data, transmission of the data takes a prolonged period of time by the period of time taken for the switch between communication paths.

The present invention has been made in view of the problem above. An object of the invention is to achieve fast data transmission.

Solution to Problem

A vehicle supplied with electric power from an external power supply includes: a first communication device for wirelessly communicating with a wireless communication device external to the vehicle; a second communication device for communicating with a communication device external to the vehicle by utilizing, as a communication path, a charging cable for supplying electric power from the power supply to the vehicle and a charging port provided at the vehicle for connection of the charging cable thereto; and a control device for controlling communication by the first communication device and communication by the second communication device, depending on a remaining amount of data to be transmitted.

A communication system for a vehicle supplied with electric power from an external power supply includes: a first communication device for wirelessly communicating with a wireless communication device external to the vehicle; a second communication device for communicating with a communication device external to the vehicle by utilizing, as a communication path, a charging cable for supplying electric power from the power supply to the vehicle and a charging port provided at the vehicle for connection of the charging cable thereto; and a control device for controlling communication by the first communication device and communication by the second communication device, depending on a remaining amount of data to be transmitted.

A communication controlling method for a vehicle equipped with a first communication device for wirelessly communicating with an external wireless communication device and a second communication device for communicating with an external communication device by utilizing, as a communication path, a charging cable for supplying electric power from an external power source and a charging port provided for connection of the charging cable thereto, includes the steps of: detecting a remaining amount of data to be transmitted; and controlling communication by the first communication device and communication by the second communication device, depending on the remaining amount of data to be transmitted.

Advantageous Effects of Invention

Wireless communication with the wireless communication device external to the vehicle and communication through the charging cable and the charging port are controlled depending on the remaining amount of data to be transmitted. This enables use of communication at higher communication speed between wireless communication with the wireless communication device external to the vehicle and communication through the charging cable and the charging port when the remaining amount of data to be transmitted is large. As a result, although a period of time for switching communication paths is further required, transmission of data can be completed faster than if the data were transmitted using communication at low communication speed. When the remaining amount of data to be transmitted is small, transmission of the data can be continued by the communication in use without switching communication paths. As a result, transmission of the data is completed faster than if the communication paths were switched. Therefore, fast data transmission can be achieved.

DESCRIPTION OF EMBODIMENTS

Figure 1:
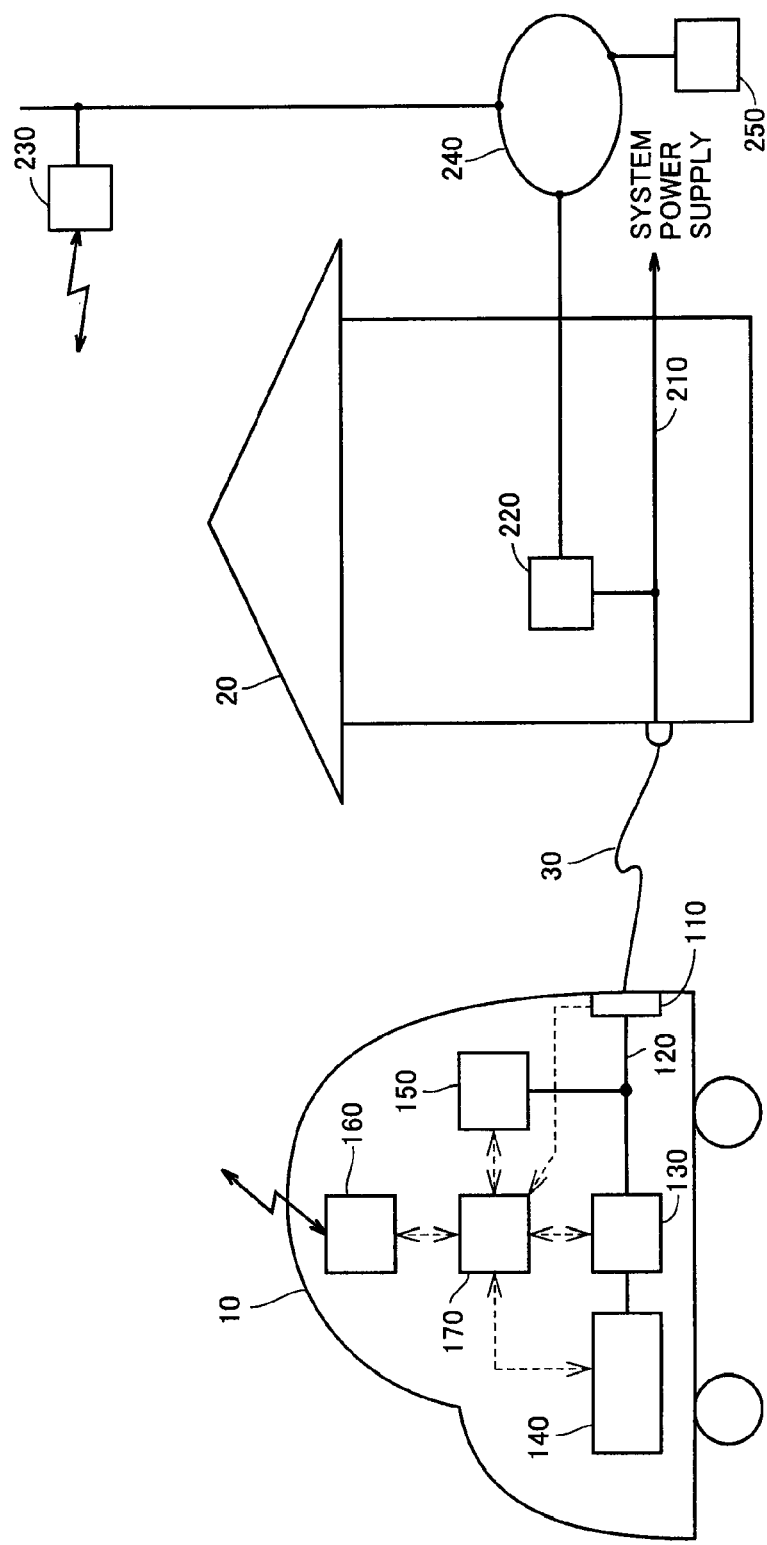
FIG. 1 is a diagram showing an overall configuration of a charging system.

An embodiment will be hereinafter described in detail with reference to the drawings. It is noted that in the drawings, the same or corresponding elements have the same reference characters allotted, and description thereof will not be repeated.

Referring to FIG. 1, a power storage device mounted on a vehicle 10 can be charged with a commercial power supply (for example, system power supply) by connecting a charging cable 30 between vehicle 10 and a power supply receptacle of a house 20. It is noted that charging vehicle 10 by a power supply external to the vehicle (for example, a system power supply) is hereinafter referred to also as "external charging".

Vehicle 10 includes a charging port 110, a power input line 120, a charger 130, a motive power output device 140, a PLC processing device 150, a wireless communication device 160, and a communication control device 170. Among them, at least PLC processing device 150, wireless communication device 160, and communication control device 170 are included in a communication system of vehicle 10.

Charging port 110 is configured such that charging cable 30 is can be connected thereto. It is noted that when charging cable 30 is connected to charging port 110, communication control device 170 is notified of this fact. For example, the fact that charging cable 30 is connected to charging port 110 is detected with a connector signal CNCT, and communication control device 170 is notified of that fact.

Charger 130 is connected to charging port 110 through power input line 120. Charger 130 converts electric power inputted from charging port 110 into a predetermined charging voltage and outputs the converted voltage to a power storage device (not shown) included in motive power output device 140. Charger 130 also exchanges various predetermined data with communication control device 170 during external charging.

Motive power output device 140 outputs travel driving force for vehicle 10. Motive power output device 140 includes a power storage device which is not shown in the drawings. The power storage device is charged by charger 130 during external charging. Further, motive power output device 140 exchanges various predetermined data with communication control device 170 during the traveling of the vehicle and during external charging.

PLC processing device 150 is connected to power input line 120. During external charging, PLC processing device 150 can perform PLC-based communication with a PLC processing device 220 provided at house 20, by utilizing charging port 110 and charging cable 30 as a communication path. PLC processing device 150 is configured of a modem, for example. During external charging, PLC processing device 150 receives, from power input line 120 data, data of a high-frequency signal transmitted from PLC processing device 220 of house 20 and demodulates the received data, and modulates data to be sent to PLC processing device 220 of house 20 and outputs the modulated data to power input line 120. It is noted that AC power supplied from a system power supply via charging cable 30 to vehicle 10 has a frequency of, for example, 50 Hz or 60 Hz in Japan, whereas a high frequency signal communicated via charging cable 30 during PLC-based communication has a frequency of, for example, between several MHz to several tens of MHz.

Wireless communication device 160 is configured such that it can communicate with a wireless communication device (base station) 230 put in place by, for example, a cell-phone carrier. For wireless communication, any wireless communication standard is used. In the present embodiment, the maximum speed of communication by wireless communication device 160 is lower than the maximum speed of communication by PLC processing device 150.

Communication control device 170 controls communication by wireless communication device 160 and communication by PLC processing device 150, depending on the remaining amount of data to be transmitted (received or sent). For example, when the transmitted remaining amount of data is larger than a predetermined amount when charging cable 30 is connected to charging port 110 while in communication by wireless communication device 160, communication control device 170 makes a switch from communication by wireless communication device 160 to communication by PLC processing device 150. When the remaining amount of data to be transmitted is smaller than the predetermined amount when charging cable 30 is connected to charging port 110 while in communication by wireless communication device 160, communication control device 170 continues communication by wireless communication device 160. That is, no switch from communication by wireless communication device 160 to communication by PLC processing device 150 is made.

House 20 includes a power line 210 and PLC processing device 220. Power line 210 is connected to the system power supply. In addition, charging cable 30 is connected to the power supply receptacle of power line 210 during the external charging of vehicle 10.

PLC processing device 220 is connected to power line 210. PLC processing device 220 can perform PLC-based communication with PLC processing device 150 of vehicle 10 by utilizing charging cable 30 and charging port 110 of vehicle 10 as a communication path during the external charging of vehicle 10. PLC processing device 220 is also configured of, for example, a modem as with PLC processing device 150 of vehicle 10. During external charging, PLC processing device 220 receives, from power line 210, data of a high-frequency signal transmitted from PLC processing device 150 of vehicle 10 and demodulates the received data, and modulates data to be transmitted to PLC processing device 150 of vehicle 10 and outputs the modulated data to power line 210. Wireless communication device 230 is capable of wirelessly communicating with, for example, wireless communication device 160 mounted on vehicle 10.

Wireless communication device 230 and PLC processing device 220 are connected to a data communication network 240 such as the Internet. Wireless communication device 230 and PLC processing device 220 communicate via data communication network 240 such as the Internet with a server 250 operated and managed by, for example, an automobile manufacturer. In the embodiment, for example, data for updating a map used in a car navigation system provided in vehicle 10 is sent from server 250. It is noted that the transmitted data is not limited to the above. Data may be sent from vehicle 10 to server 250.

Figure 2:
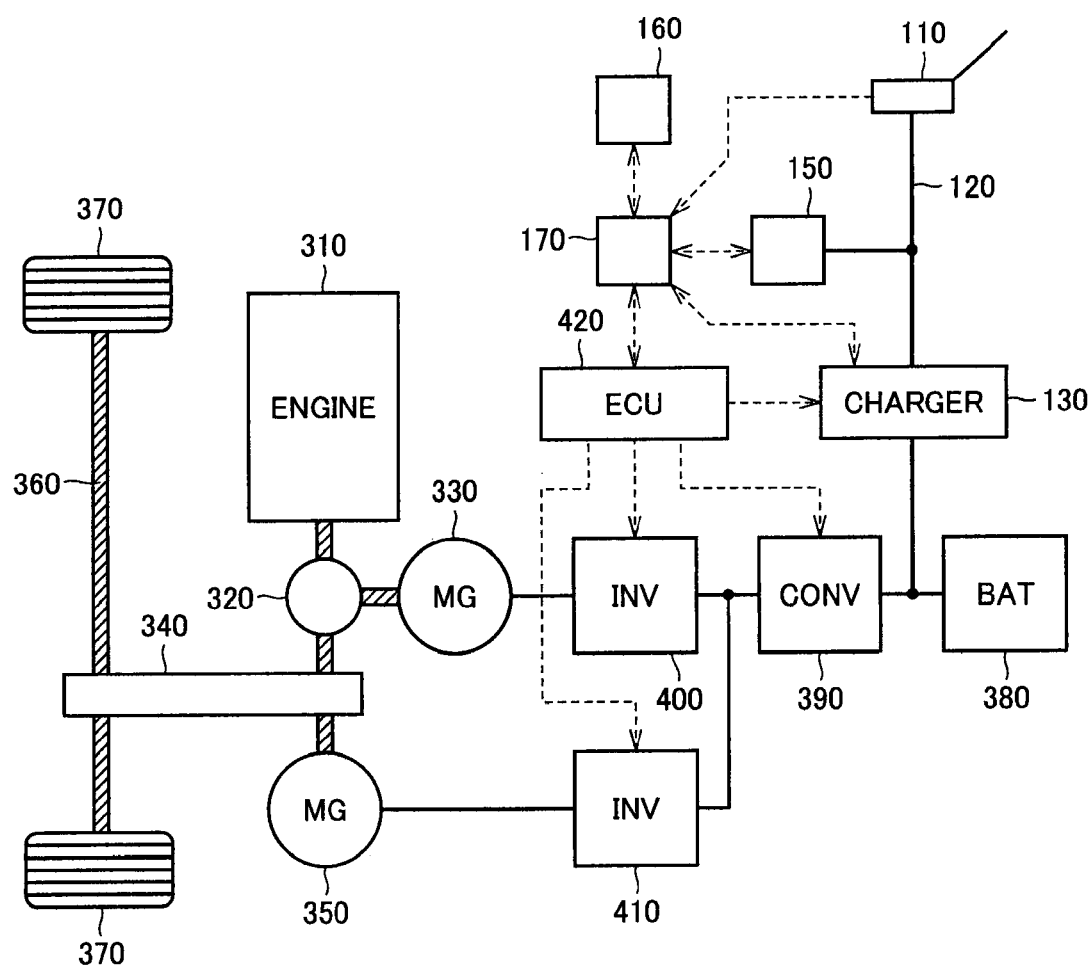
FIG. 2 is an overall block diagram of a vehicle shown in FIG. 1.

Referring to FIG. 2, further description of vehicle 10 will be given. It is noted that vehicle 10 is not limited to one that has a configuration as described below and may be implemented by an electric vehicle or a fuel cell vehicle in stead of the hybrid vehicle shown in FIG. 2.

Vehicle 10 includes an engine 310, a motive power split device 320, motor generators 330, 350, a speed reducer 340, a drive shaft 360, and drive wheels 370. Vehicle 10 further includes a power storage device 380, a boost converter 390, inverters 400, 410, and an ECU (Electronic Control Unit) 420. Vehicle 10 still further includes, as shown in FIG. 1, charging port 110, power input line 120, charger 130, PLC processing device 150, wireless communication device 160, and communication control device 170.

Engine 310 and motor generators 330, 350 are linked to motive power split device 320. Vehicle 10 travels powered by driving force from at least one of engine 310 and motor generator 350. Motive power split device 320 splits the motive power generated by engine 310 between two paths, i.e. one path for transmission via speed reducer 340 to drive shaft 360 and the other path for transmission to motor generator 330.

Motor generator 330 is an AC rotating electric machine, for example, a three-phase AC synchronous electric machine. Motor generator 330 generates electricity using motive power of engine 310 which has been split by motive power split device 320. For example, when the state of charge (also called as "SOC") of power storage device 380 becomes lower than a predetermined value, engine 310 starts up so that motor generator 330 generates electricity. The electric power generated by motor generator 330 is then converted from AC to DC by inverter 400 and stepped down by boost converter 390 and then stored in power storage device 380.

Motor generator 350 is an AC rotating electric machine, for example, a three-phase AC synchronous electric machine. Motor generator 350 generates driving force for the vehicle using at least one of electric power stored in power storage device 380 and electric power generated by motor generator 330. Driving force of motor generator 350 is then transmitted via speed reducer 340 to drive shaft 360.

It is noted that during the braking of the vehicle, motor generator 350 is driven using kinetic energy of the vehicle, and motor generator 350 operates as an electric generator. This causes motor generator 350 to operates as a regenerative brake which converts braking energy into electric power. The electric power generated by motor generator 350 is then stored in power storage device 380.

Motive power split device 320 is formed of a planetary gear including a sun gear, a pinion gear, a carrier, and a ring gear. The pinion gear engages with the sun gear and the ring gear. The carrier supports the pinion gear in a rotatable manner and is linked to a crankshaft of engine 310. The sun gear is linked to a rotation shaft of motor generator 330. The ring gear is linked to a rotation shaft of motor generator 350 and speed reducer 340.

Power storage device 380 is a rechargeable DC power supply and formed of, for example, a secondary battery such as a nickel-metal hydride battery or a lithium-ion battery. Power storage device 380 stores not only electric power generated by motor generators 330, 350 but also electric power supplied from the power supply external to the vehicle (system power supply in FIG. 1) and inputted from charging port 110 during external charging. It is noted that power storage device 380 may be implemented by a capacitor having a large capacity.

Based on a control signal from ECU 420, boost converter 390 regulates a DC voltage applied to inverters 400, 410 to be not less than the voltage of power storage device 380. Boost converter 390 is configured of a boost chopper circuit, for example.

Based on a control signal from ECU 420, inverter 400 converts electric power generated by motor generator 330 into DC power and outputs the DC power to boost converter 390. Based on a control signal from ECU 420, inverter 410 converts electric power supplied from boost converter 390 into AC power and outputs the AC power to motor generator 350. It is noted that during start-up of engine 310, inverter 400 converts electric power supplied from boost converter 390 into AC power and outputs the AC power to motor generator 330. During the braking of the vehicle, inverter 410 converts electric power generated by motor generator 350 into DC power and outputs the DC power to boost converter 390.

ECU 420 generates a control signal for driving boost converter 390 and motor generators 330, 350 and outputs the generated control signal to boost converter 390 and inverters 400, 410. During external charging, ECU 420 outputs a control signal for driving charger 130 and outputs the control signal to charger 130.

It is noted that charging port 110, power input line 120, charger 130, PLC processing device 150, wireless communication device 160, and communication control device 170 have been described in FIG. 1, and therefore, the description thereof will not be repeated. Charger 130 is connected between power storage device 380 and boost converter 390.

It is noted that engine 310, motive power split device 320, motor generators 330, 350, speed reducer 340, drive shaft 360, drive wheels 370, power storage device 380, boost converter 390, inverters 400, 410, and ECU 420 make up motive power output device 140 shown in FIG. 1.

Figure 3:
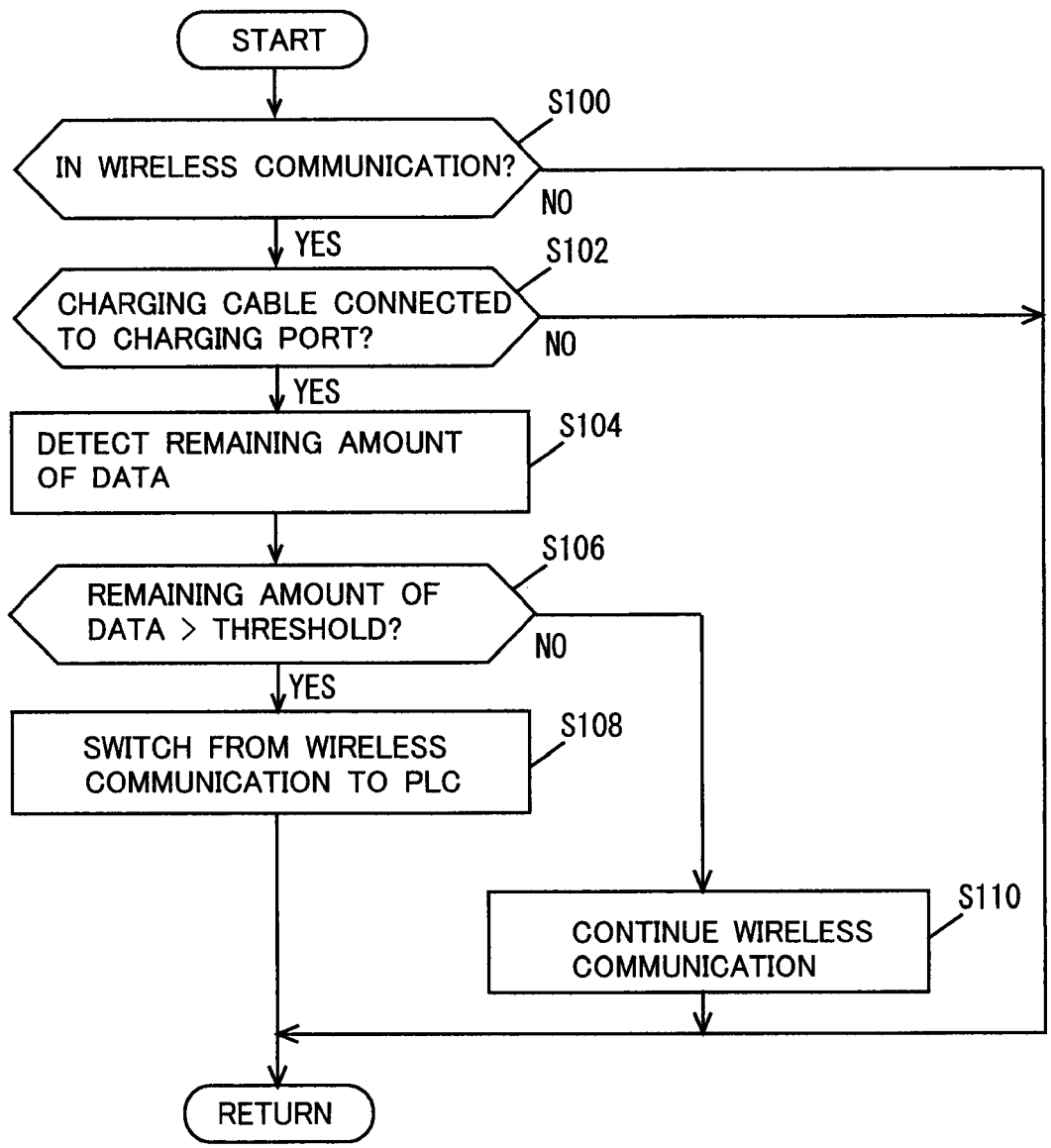
FIG. 3 is a flowchart showing a process executed by a communication control device shown in FIG. 1.

Referring to FIG. 3, a process executed by communication control device 170 will be described.

In step (hereinafter step will be abbreviated as S100), communication control device 170 determines whether or not in communication by wireless communication device 160. If in communication by wireless communication device 160 (YES in S100), the process shifts to S102. If not (NO in S100), the process returns to S100.

In S102, communication control device 170 determines whether or not charging cable 30 is connected to charging port 110. If charging cable 30 is connected to charging port 110 (YES in S102), the process shifts to S104. If not (NO in S102), the process returns to S100.

In S104, communication control device 170 detects the remaining amount of data to be transmitted (the amount of unreceived or unsent data of the total amount of data to be received or to be sent). In the present embodiment, remaining amount of data to be received by vehicle 10 is detected. For example, the remaining amount of data to be received by vehicle 10 is detected by subtracting the amount of received data from the total amount of data of the contents whose data is being received by way of communication by wireless communication device 160. It is noted that it is only necessary to employ a well known technology for a method of obtaining the total amount of data of the contents and the amount of received data, and that therefore, the detailed description thereof will not be repeated. In stead of the remaining amount of data to be received by vehicle 10, the remaining amount of data to be sent by vehicle 10 may be detected.

In step S106, communication control device 170 determines whether or not the remaining amount of data to be transmitted is larger than an amount which has been predetermined as a threshold. The amount predetermined as a threshold is, for example, the amount of data which can be transmitted by way of communication by wireless communication device 160 within a period of time required to make a switch from communication by wireless communication device 160 to communication by PLC processing device 150.

The period of time required to make a switch from communication by wireless communication device 160 to communication by PLC processing device 150 is predetermined by a developer based on experimental and simulational results and the like. The amount of data that can be transmitted by way of communication by wireless communication device 160 within a period of time required to make a switch from communication by wireless communication device 160 to communication by PLC processing device 150 is calculated from the speed of communication by wireless communication device 160. It is noted that a method of determining the amount predetermined as a threshold is not limited to the above.

If the remaining amount of data to be transmitted is larger than the threshold (YES in S106), the process shifts to S108. If the remaining amount of data to be transmitted is equal to or smaller than the threshold (NO in S106), the process shifts to S110.

In S108, communication control device 170 makes a switch from communication by wireless communication device 160 to communication by PLC processing device 150.

In S110, communication control device 170 continues communication by wireless communication device 160. That is, no switch from communication by wireless communication device 160 to communication by PLC processing device 150 is made.

The operation of communication control device 170 based on the configuration as above and flowcharts will be described.

While in communication by wireless communication device 160 (YES in S100), when charging cable 30 is connected to charging port 110 (YES in S102), the remaining amount of data to be transmitted is detected (S104).

When the remaining amount of data to be transmitted is larger than a threshold (YES in S106), a switch from communication by wireless communication device 160 to communication by PLC processing device 150 is made (S110).

Figure 4:
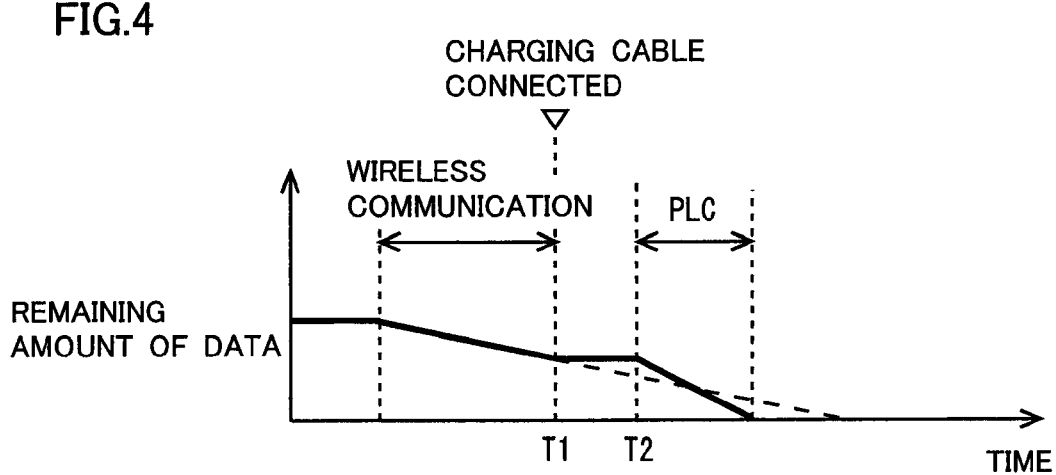
FIG. 4 is a timing chart (No. 1) showing changes in the remaining amount of data to be transmitted.

This enables performing communication at high speed by PLC processing device 150. As a result, although a period of time for switching communication paths is further required between time T1 and T2 as shown in FIG. 4, receipt of data can be completed faster than if communication by wireless communication device 160 were continued.

As mentioned above, a switch between communication by wireless communication device 160 from communication by PLC processing device 150 takes a predetermined period of time for authentication at server 250 or the like. Therefore, when the remaining amount of data to be received is small, switching communication paths could conversely cause delay in completion of data transmission.

Figure 5:
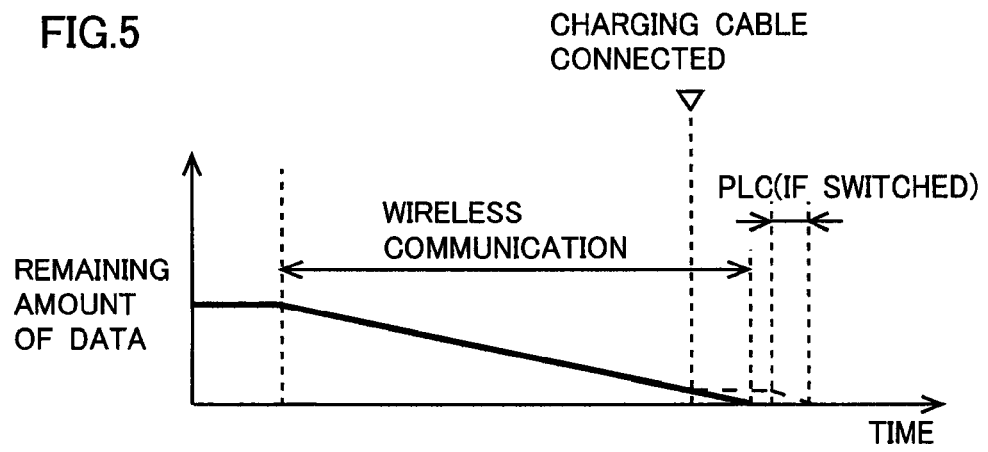
FIG. 5 is a timing chart (No. 2) showing changes in the remaining amount of data to be transmitted.

Thus, when the amount of remaining amount of data to be transmitted is equal to or smaller than the threshold (NO in S106), communication by wireless communication device 160 is continued (S110) as indicated by a continuous line in FIG. 5. This enables data transmission to be completed faster than if communication paths were switched. Therefore, fast data transmission can be achieved.

REFERENCE SIGNS LIST 10 vehicle; 20 house; 30 charging cable; 110 charging port; 120 power input line; 130 charger; 140 motive power output device; 150, 220 PLC processing device; 160 wireless communication device; 170 communication control device; 210 power line; 230 wireless communication device; 240 data communication network; 250 server; 260 wireless communication device; 310 engine; 320 motive power split device; 330, 350 motor generator; 340 speed reducer; 360 drive shaft; 370 drive wheel; 380 power storage device; 390 boost converter; 400, 410 inverter; 420 ECU.

The invention claimed is:

1. A vehicle supplied with electric power from an external power supply, comprising:
   a first communication device for wirelessly communicating with a wireless communication device external to said vehicle;
   a second communication device for communicating with a communication device external to said vehicle by utilizing, as a communication path, a charging cable for supplying electric power from said power supply to said vehicle and a charging port provided at said vehicle for connection of said charging cable thereto; and
   a control device for controlling communication by said first communication device and communication by said second communication device, depending on a remaining amount of data to be transmitted, wherein
   said control device
      makes a switch from communication by said first communication device to communication by said second communication device when said remaining amount of data to be transmitted is larger than a predetermined amount when said charging cable is connected to said charging port while in communication by said first communication device, and
      continues communication by said first communication device when said remaining amount of data to be transmitted is smaller than said predetermined amount when said charging cable is connected to said charging port while in communication by said first communication device.

2. A communication system for a vehicle supplied with electric power from an external power supply, comprising:
   a first communication device for wirelessly communicating with a wireless communication device external to said vehicle;
   a second communication device for communicating with a communication device external to said vehicle by utilizing, as a communication path, a charging cable for supplying electric power from said power supply to said vehicle and a charging port provided at said vehicle for connection of said charging cable thereto; and
   a control device for controlling communication by said first communication device and communication by said second communication device, depending on a remaining amount of data to be transmitted, wherein
   said control device
      makes a switch from communication by said first communication device to communication by said second communication device when said remaining amount of data to be transmitted is larger than a predetermined amount when said charging cable is connected to said charging port while in communication by said first communication device, and continues communication by said first communication device when said remaining amount of data to be transmitted is smaller than said predetermined amount when said charging cable is connected to said charging port while in communication by said first communication device.

3. A communication controlling method for a vehicle equipped with a first communication device for wirelessly communicating with an external wireless communication device and a second communication device for communicating with an external communication device by utilizing, as a communication path, a charging cable for supplying electric power from an external power source and a charging port provided for connection of said charging cable thereto, the method comprising the steps of:

detecting a remaining amount of data to be transmitted; and controlling communication by said first communication device and communication by said second communication device, depending on said remaining amount of data to be transmitted, wherein;

controlling communication by said first communication device and communication by said second communication device includes:

making a switch from communication by said first communication device to communication by said second communication device when said remaining amount of data to be transmitted is larger than a predetermined amount when said charging cable is connected to said charging port while in communication by said first communication device; and continuing communication by said first communication device when said remaining amount of data to be transmitted is smaller than said predetermined amount when said charging cable is connected to said charging port while in communication by said first communication device.

* * * * *